Sept. 6, 1932.  E. W. SEAHOLM ET AL  1,875,508
BRAKE
Original Filed Feb. 13, 1924
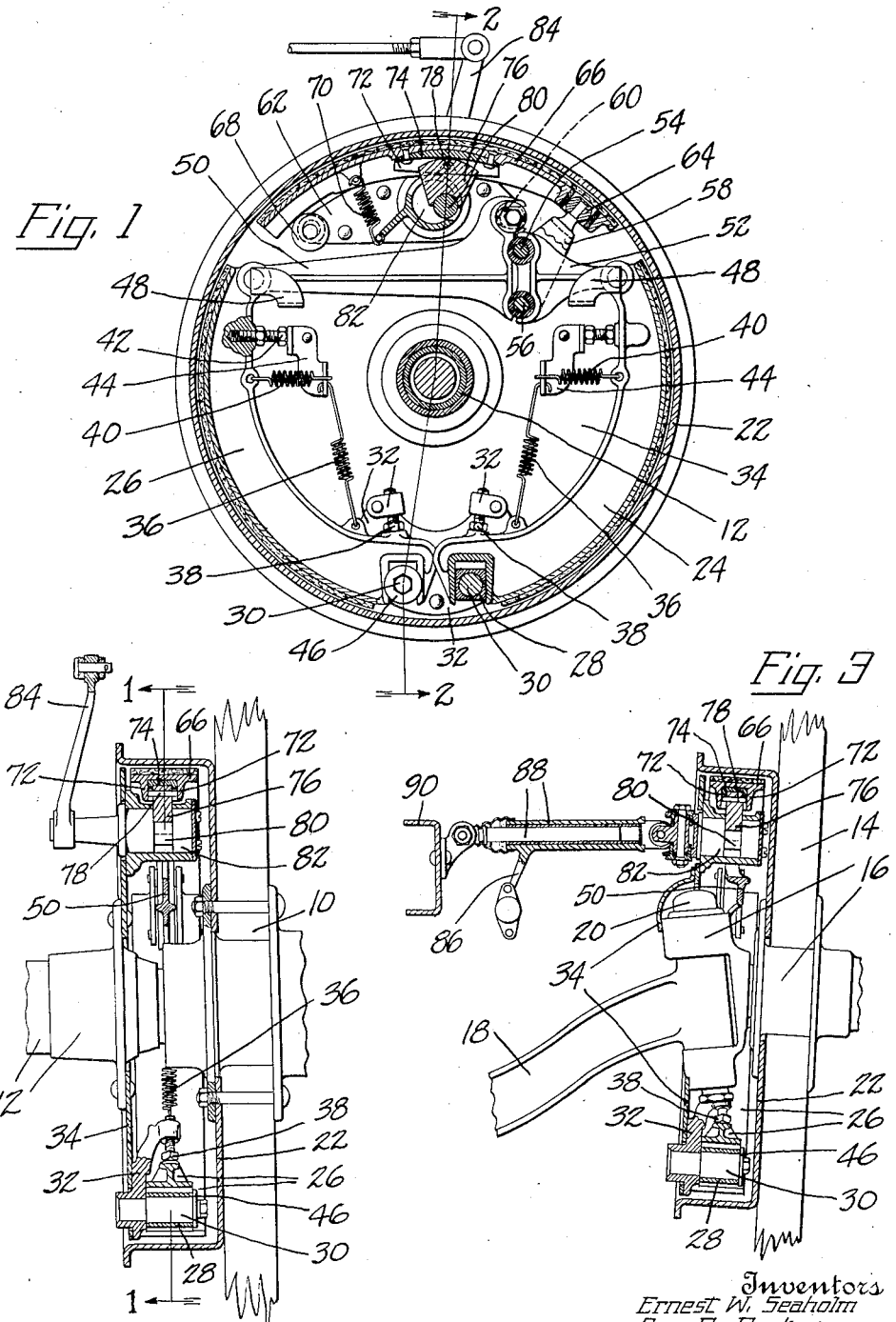
Inventors
Ernest W. Seaholm
Guy E. Parker
Arthur H. Stahlhuth
By their Attorneys Patented Sept. 6, 1932

1,875,508

UNITED STATES PATENT OFFICE

ERNEST W. SEAHOLM, GUY E. PARKER, AND ARTHUR H. STAHLHUTH, OF DETROIT, MICHIGAN, ASSIGNORS TO BENDIX BRAKE COMPANY, OF CHICAGO, ILLINOIS, A CORPORATION OF ILLINOIS

BRAKE

Application filed February 13, 1924, Serial No. 692,526. Renewed May 22, 1931.

This invention relates to brakes, and is illustrated as embodied in a servo or booster brake for the road wheel of an automobile.

One object of the invention is to provide an efficient and effective servo device which is rugged in construction, and which preferably can readily be adjusted with great accuracy.

Another object of the invention is to provide servo connections which can be mounted on front wheels without interfering with the connections between the axles and knuckles, and without interfering with swiveling movement of the wheels.

In one desirable embodiment shown in the drawing, the brake shoes are connected to oppositely-movable members engaged by a lever operated by a servo shoe capable of limited circumferential movement when in operative engagement with the brake drum. Driver-controlled connections are provided for moving the servo shoe against the drum, and when used on a front wheel these connections include a universal joint above the king pin to permit the wheel to swivel about the king pin in steering the vehicle.

The above and other objects and features of the invention, including various novel combinations of parts and desirable particular constructions, will be apparent from the following description of the illustrative embodiment shown in the accompanying drawing, in which Fig. 1 is a section substantially on the line 1—1 of Fig. 2, showing the brake partly in side elevation and partly in longitudinal vertical section;

Fig. 2 is a section on the line 2—2 of Fig. 1, showing the brake in transverse vertical section; and Fig. 3 is a view corresponding to Fig. 2, but showing the brake on a front wheel.

Our improved brake is shown in these figures, for purposes of illustration, mounted on the road wheel of a vehicle, either a rear wheel 10 (Figs. 1 and 2) supported on and driven by a rear live axle 12, or on a front wheel 14 (Fig. 3) journaled on a knuckle 16 swiveled on a front axle 18 by a king pin 20. In either case, the major part of the braking is due to frictional engagement with a drum 22 of a pair of brake shoes 24 and 26. Each of these shoes is formed at its anchor end with a rectangular slot slidably embracing a block 28 journaled on a stub shaft 30 supported on a bracket 32 integral with or secured to a dust plate 34 carried by the axle 12 or the knuckle 16. The shoes are urged away from the drum 22 by return springs 36 as far as permitted by stops 38 adjustably threaded into arms of brackets 32. Each shoe is also urged away from the drum at its free end by a return spring 40, as far as permitted by a stop 42 adjustably threaded into the shoe and which engages a bracket 44 secured to plate 34. We find it convenient to attach return springs 36 and 40 to the brackets 44. The shoes are held laterally at the anchor ends by the brackets 32 and by washers 46, and at their free ends by sliding engagement with the arm of U-shaped stampings 48 secured to plate 34.

The shoes 24 and 26 are spread apart against the drum by a power-multiplying linkage including a pair of members 50 and 52 pivotally connected to their free ends, and arranged substantially in alinement with each other. The member 52 is provided with a pair of semi-cylindrical recesses engaging rollers 54 and 56 mounted on a floating brake-operating lever 58, the member 50 being provided with corresponding semi-cylindrical recesses engaging the rollers and with a rectangular slot embracing a roller 60 supported by an eccentric carried by a bracket 62 riveted to plate 34, the eccentric permitting adjustment of the vertical position of the various parts.

Lever 58 has a substantially spherical head 64 embraced by lugs on the bottom of a servo or booster shoe 66 capable of limited circumferential movement when in frictional engagement with drum 22, such movement serving to rock lever 58 in one direction or the other and spread shoes 24 and 26 apart through the medium of members 50 and 52. Servo shoe 66 is supported at one end in rolling engagement with a roller fulcrum member 68 eccentrically supported on bracket 62 to permit radial adjustment, and is urged away from the brake drum by a return spring 70.

The servo shoe is provided at its center with a pair of parallel guide lugs 72, between which is arranged a bearing plate 74 of hardened steel engaged by a cam link member 76 which has rolling engagement with the bearing plate, and which is positioned with respect thereto by a cross pin 78 which enters notches in the guide lugs 72. Member 76 is pivotally supported on a crank pin 80 carried by a rock-shaft 82 operated by an arm 84 (Figs 1 and 2), or by an arm 86 on a telescoping rock-shaft 88 having a universal joint above the king pin 20 (Fig. 3), and supported by a universal joint on the chassis frame 90. As explained in application S. N. 674,235, filed November 12, 1923 by E. W. Seaholm, the connections 86—88—90—82 shown in Fig. 3 operate to release the outer brake automatically in rounding a corner to guard against the possibility of loss of steering control by reason of locking the wheels.

In operation, manipulation of arm 84 or arm 86 by the driver, through the usual connections, moves member 76 radially outward against the resistance of spring 70, to press servo shoe 66 against the brake drum. If the drum is turning in either direction, the servo shoe is frictionally urged circumferentially in the same direction, and moves more or less, according to the force applied by the driver, thus rocking lever 58 and forcing shoes 24 and 26 against the brake drum. Advantage is thus taken of the momentum of the vehicle to apply the brakes with great force with comparatively little exertion on the part of the driver. Servo shoe 66 is supported by rolling engagement with roller 68 and member 76. Member 76 may have its servo-engaging surface concentric with the crank pin 80, or, to guard against any possibility of "grabbing", this surface may have its axis slightly above the axis of the crank-pin, so that as the servo shoe moves circumferentially the pressure on it is slightly relieved, or else it becomes necessary further to depress the brake pedal or its equivalent.

While one illustrative embodiment of our invention has been described in detail, it is not our intention to limit its scope to that embodiment, or otherwise than by the terms of the appended claims.

We claim:

1. A brake comprising, in combination, a drum, a pair of pivoted shoes within the drum, a push member engaging the free end of each shoe, the inner end of each push member being formed with two recesses, the recesses in the two members being alined to form a pair of bearings, a floating lever having a pair of pins in the bearings, and a servo shoe connected to the lever to rock it when moved circumferentially by the drum.

2. A brake comprising, in combination, a drum, an expansible friction device within the drum, a circumferentially movable servo member engageable and movable with the drum, and floating connections operated by movement of the servo member to force the free ends of the friction device outwardly.

3. A brake comprising, in combination, a drum, an expansible friction device within the drum, a circumferentially movable servo member engageable with the inner surface of the drum, and a pair of members forced outwardly by movement of the servo member and engaging the ends of the friction device to expand it.

4. A brake comprising, in combination, a drum, an expansible friction device within the drum, a circumferentially movable servo member engageable with the inner surface of the drum and movable with the drum, and a pair of separate connections operating by movement of the servo member and engaging the ends of the friction device to expand it.

5. A brake comprising, in combination, a drum, a pair of pivoted shoes oppositely arranged within the drum, a servo shoe engageable and movable with the drum between the ends of the pivoted shoes, and floating means operated by movement of the servo shoe to force the free ends of the pivoted shoes outwardly.

6. A brake comprising, in combination, a drum, a pair of pivoted shoes oppositely arranged within the drum, a servo shoe engageable and movable with the drum between the ends of the pivoted shoes, and a floating linkage operated by movement of the servo shoe and connected to the free ends of the pivoted shoes to force them outwardly.

7. A brake comprising, in combination, a drum, an expansible friction device within the drum, a circumferentially movable servo member engageable and movable with the drum, and floating connections operated by movement of the servo member in either direction to force the free ends of the friction device outwardly.

8. A brake comprising, in combination, a drum, a pair of pivoted shoes oppositely arranged within the drum, a servo shoe engageable and movable with the drum between the ends of the pivoted shoes, and floating means operated by movement of the servo shoe in either direction to force the free ends of the pivoted shoes outwardly.

9. A brake comprising, in combination, a drum, three brake shoes arranged end to end within the drum and two of which are anchored at their adjacent ends, and means connecting one end of the third shoe to the adjacent unanchored end of one of the anchored shoes.

10. A brake comprising, in combination, a drum, three brake shoes arranged end to end within the drum, and means connecting one end of the third shoe to the adjacent end of one of the other shoes.

11. A brake having a friction device with separable ends spaced some distance apart, and a servo shoe arranged between said ends, in combination with means connecting one end of the servo shoe to the adjacent end of the friction device.

12. A brake having a friction device with separable ends spaced some distance apart, and a servo shoe arranged between said ends, in combination with means connecting one end of the servo shoe to both ends of the friction device.

13. A brake comprising friction means, in combination with a servo shoe, a lever operatively connected to said shoe, and a thrust device pivotally engaging said lever and acting on the friction means, together with applying means independent of said lever and acting on the servo shoe.

14. A brake comprising friction means, in combination with a servo shoe, a lever operatively connected to said shoe, and two oppositely-directed thrust devices pivotally engaging said lever and acting on the friction means, together with applying means independent of said lever and acting on the servo shoe.

15. A brake comprising two anchored shoes and an unanchored shoe arranged end to end, and power-multiplying means operatively connecting one end of the unanchored shoe to at least one of the anchored shoes.

16. A brake comprising two anchored shoes and an unanchored shoe arranged end to end, and power-multiplying means operatively connecting one end of the unanchored shoe to both of the anchored shoes.

17. A brake comprising a main friction device and a servo shoe arranged end to end, in combination with a lever operated by the servo shoe and operating the friction device and which can float bodily to adjust its position automatically.

18. A brake comprising a main friction device and a servo shoe arranged end to end, in combination with means operated by the servo shoe and operating the friction device and which can float to adjust its position automatically.

19. A brake comprising friction means, in combination with a shaft and a pivot offset from the axis of the shaft and operated by the shaft, and an applying device operated by the pivot and disconnectedly engaging the friction means and supported between the pivot and the friction means.

20. A brake comprising friction means, in combination with a shaft and a pivot offset from the axis of the shaft and operated by the shaft, and a segmental roller mounted on the pivot and engaging the friction means and supported between the pivot and the friction means.

21. Operating mechanism for brake friction means including a pair of thrust members having two sets of registering half-sockets, in combination with a lever having thrust parts in the sockets.

22. Servo mechanism for a brake comprising, in combination, a servo shoe, operating means at one end of and operated by the servo shoe, a support for the other end of the shoe when the brake is released, and applying means acting on the shoe between the operating means and the support.

23. A brake comprising, in combination, a rotatable drum, a pair of shoes anchored within the drum, a third shoe arranged between said pair of shoes and in proximity to the unanchored end of one of them, and means for forcing said shoes against the drum including an operating connection acting upon the third shoe to force it against the drum and a connection between one end of the third shoe and the adjacent unanchored end of one of said anchored shoes whereby said anchored shoe is energized through said third shoe to engage the drum.

24. A brake comprising, in combination, a rotatable drum, a pair of shoes anchored within the drum, a third shoe arranged between said pair of shoes and in proximity to the unanchored end of one of them, and means for forcing said shoes against the drum comprising a part engaging the third shoe to force it against the drum and a connection between one end of said third shoe and the adjacent end of one of said anchored shoes including a pair of cooperating members one for each shoe.

In testimony whereof we affix our signatures.

ERNEST W. SEAHOLM.
ARTHUR H. STAHLHUTH.
GUY E. PARKER.